US012766639B2

(12) United States Patent
Iizuka

(10) Patent No.: US 12,766,639 B2
(45) Date of Patent: Oct. 20, 2026

(54) MARKING MACHINE AND WAFER PRODUCTION SYSTEM

(71) Applicant: DISCO CORPORATION, Tokyo (JP)

(72) Inventor: Kentaro Iizuka, Tokyo (JP)

(73) Assignee: DISCO CORPORATIN, Tokyo (JP)

( * ) Notice: Subject to any disclaimer, the term of this patent is extended or adjusted under 35 U.S.C. 154(b) by 681 days.

(21) Appl. No.: 17/806,828

(22) Filed: Jun. 14, 2022

(65) Prior Publication Data

US 2022/0410320 A1 Dec. 29, 2022

(30) Foreign Application Priority Data

Jun. 29, 2021 (JP) ................................ 2021-107580

(51) Int. Cl.

| | |
|---|---|
| ***B23K 26/53*** | (2014.01) |
| ***B23K 26/00*** | (2014.01) |
| ***B23K 103/00*** | (2006.01) |
| ***B28D 5/00*** | (2006.01) |

(52) U.S. Cl.

CPC .......... *B23K 26/53* (2015.10); *B23K 26/0006* (2013.01); *B28D 5/0011* (2013.01); *B23K 2103/56* (2018.08); *B28D 5/0052* (2013.01)

(58) Field of Classification Search

CPC ...... B23K 26/00; B23K 26/18; B23K 26/362; G03F 7/00; G11B 7/00

See application file for complete search history.

(56) References Cited

U.S. PATENT DOCUMENTS

| | | | | |
|---|---|---|---|---|
| 6,420,792 | B1 * | 7/2002 | Guldi | H01L 23/544 438/959 |
| 6,482,661 | B1 * | 11/2002 | Madoyski | B41M 5/24 438/16 |
| 11,219,966 | B1 * | 1/2022 | Donofrio | B23K 26/032 |
| 2004/0089958 | A1 * | 5/2004 | Arai | H01L 23/544 257/E23.179 |
| 2020/0254650 | A1 * | 8/2020 | Swoboda | B23K 26/0006 |

FOREIGN PATENT DOCUMENTS

| | | | |
|---|---|---|---|
| CN | 108511417 | A | 9/2018 |
| JP | 2019029382 | A | 2/2019 |
| JP | 2020072098 | A | 5/2020 |
| TW | 200409291 | A | 6/2004 |

OTHER PUBLICATIONS

Office action issued in corresponding Chinese patent application No. 202210703381.4, dated Jun. 1, 2026.

* cited by examiner

*Primary Examiner* — Woody A Lee, Jr.
*Assistant Examiner* — Adam M Eckardt
(74) *Attorney, Agent, or Firm* — GREER BURNS & CRAIN, LTD.

(57) ABSTRACT

Provided that is a marking machine for applying markings to an ingot having separating layers formed at a depth corresponding to a thickness of a wafer to be produced. The marking machine includes a reading unit configured to read the ingot information formed on the ingot, a control unit having a storage section configured to store the ingot information read by the reading unit, and a marking unit configured to mark, based on the ingot information stored in the storage section, information that includes the ingot information, to the wafer to be produced.

10 Claims, 7 Drawing Sheets

MARKING MACHINE AND WAFER PRODUCTION SYSTEM

BACKGROUND OF THE INVENTION

Field of the Invention

The present invention relates to a marking machine and a wafer production system.

Description of the Related Art

In general, a wire saw is used as means for slicing wafers from a silicon ingot or a compound semiconductor ingot. The wire saw includes a web of wires formed by wrapping a cutting wire a number of times surrounding a plurality of rollers, and slices an ingot at wire positions by feeding the cutting wire into the ingot for slicing.

However, a wire saw leaves a relatively large cutting allowance of approximately 1 mm, and requires lapping, etching and the like to planarize surfaces after slicing, thereby involving a problem that the proportion of the material used as wafers is reduced to approximately one-third of the original ingot, and hence the productivity is poor.

A wafer producing apparatus including a wafer separating unit has therefore been proposed that irradiates a laser beam of a wavelength having transmissivity for an ingot while focusing it inside the ingot, thereby forming a separation layer in a planned separating plane, and then separates a wafer from the ingot using the separating layer as a separation starting interface (see, for example, Japanese Patent Laid-open No. 2020-72098).

Irrespective of the use of the wire saw or the use of the irradiation of the laser beam, however, the history of the wafers produced from the ingot is not fully clear. There is, accordingly, a problem that, even if a defect occurs on one or more of devices in the course of formation of the devices on a wafer, it is impossible to ascertain the cause of the defect of the device or devices by tracing back the history of the wafer.

To solve this problem, a method has been proposed that forms a production history, which may be configured in the form of a bar code, inside each wafer in addition to the formation of separating layers (see, for example, Japanese Patent Laid-open No. 2019-29382).

SUMMARY OF THE INVENTION

However, the method disclosed in Japanese Patent Laid-open No. 2019-29382 requires for an operator to visually confirm the production history formed on the ingot and then to store the production history in a separation machine every time each wafer is separated.

Accordingly, this method is too cumbersome for the operator to tolerate, and has also remained as a breeding ground for human errors.

The present invention therefore has as objects thereof the provision of a marking machine and a wafer production system, which enable to track back the history of a wafer while suppressing an increase in an operator's man-hour.

In accordance with a first aspect of the present invention, there is provided a marking machine for applying markings to on an ingot having separating layers formed at a depth corresponding to a thickness of a wafer to be produced. The marking machine includes a reading unit configured to read the ingot information formed on the ingot, a control unit having a storage section configured to store the ingot information read by the reading unit, and a marking unit configured to mark, based on the ingot information stored in the storage section, information which includes the ingot information, to the wafer to be produced.

In accordance with a second aspect of the present invention, there is provided a wafer production system for producing a wafer from an ingot. The wafer production system includes a reading unit configured to read the ingot information formed on the ingot, a control unit having a storage section configured to store the ingot information read by the reading unit, a laser beam irradiation unit configured to form separating layers in the ingot by irradiating a laser beam of a wavelength which has transmissivity for the ingot, to the ingot with a focal point thereof positioned at a depth corresponding to a thickness of the wafer to be produced, from an upper surface of the ingot, a marking unit configured to mark, based on the ingot information stored in the storage section, information which includes the ingot information, to the wafer to be produced, and a separating unit configured to separate the wafer from the ingot using, as separation starting interfaces, the separating layers formed by the laser beam irradiation unit.

Preferably, the ingot information may be formed on a lower surface of the ingot, and the reading unit may read the ingot information by imaging the ingot from a side of the lower surface of the ingot.

Preferably, the wafer production system may further include a transfer unit configured to transfer the ingot supported on a tray, and the reading unit may read the ingot information formed on the ingot with the ingot supported on the tray.

The present invention brings about an advantageous effect to enable track back of the history of a wafer while suppressing an increase in an operator's man-hour.

The above and other objects, features and advantages of the present invention and the manner of realizing them will become more apparent, and the invention itself will best be understood from a study of the following description and appended claims with reference to the attached drawings showing preferred embodiment of a first and second aspect of the invention.

DETAILED DESCRIPTION OF THE PREFERRED EMBODIMENT

With reference to the attached drawings, a description will be made in detail about an embodiment of a first aspect of the present invention and an embodiment of a second aspect of the present invention. However, the present invention shall not be limited by details that will be described in the subsequent embodiments. The elements of configurations that will hereinafter be described include those readily conceivable to persons skilled in the art and substantially the same ones. Further, the configurations that will hereinafter be described can be combined appropriately. Furthermore, various omissions, replacements, and modifications of configurations can be made without departing from the spirit of the present invention.

Embodiment of First Aspect

Figure 1:
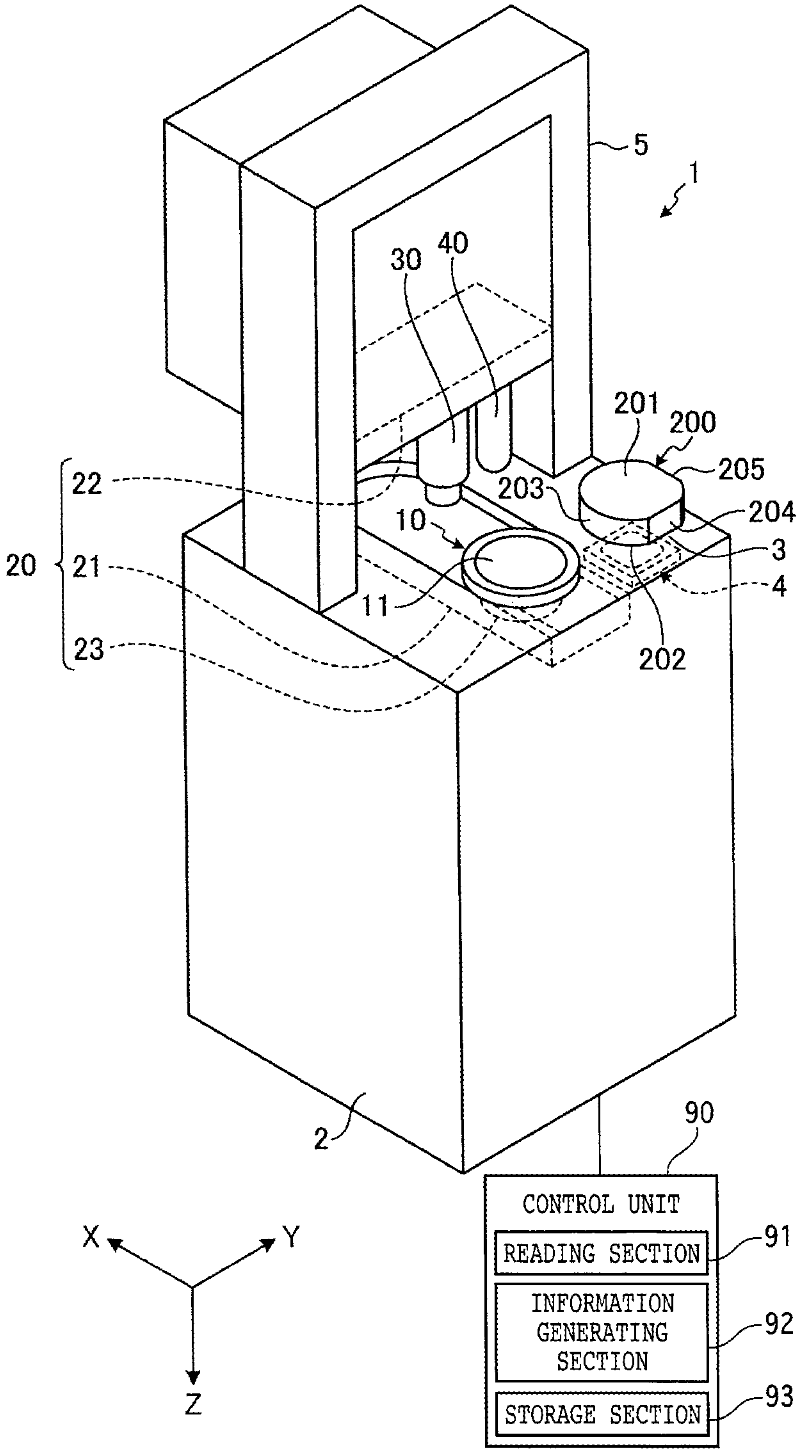
FIG. 1 is a perspective view depicting a configuration example of a marking machine according to an embodiment of a first aspect of the present invention.
Figure 2:
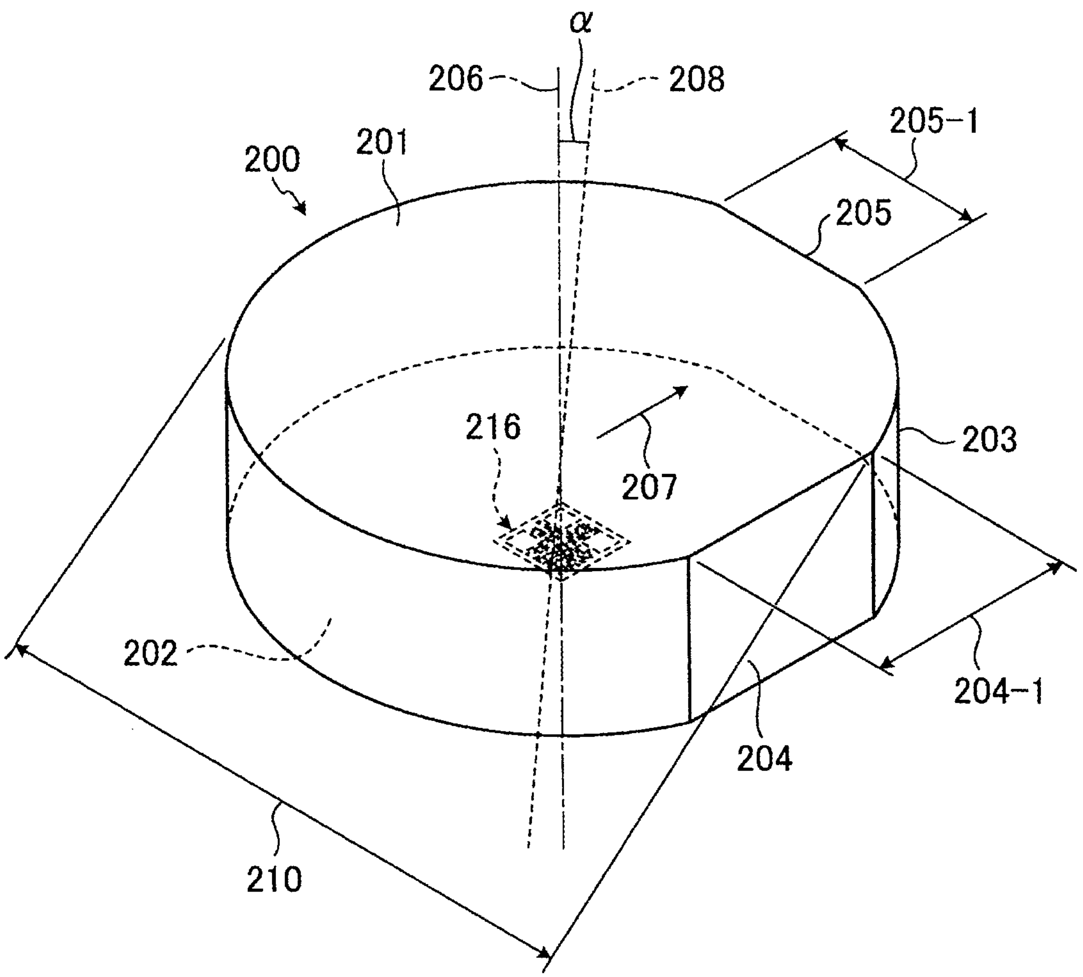
FIG. 2 is a perspective view of an ingot to be marked by the marking machine depicted in FIG. 1.
Figure 3:
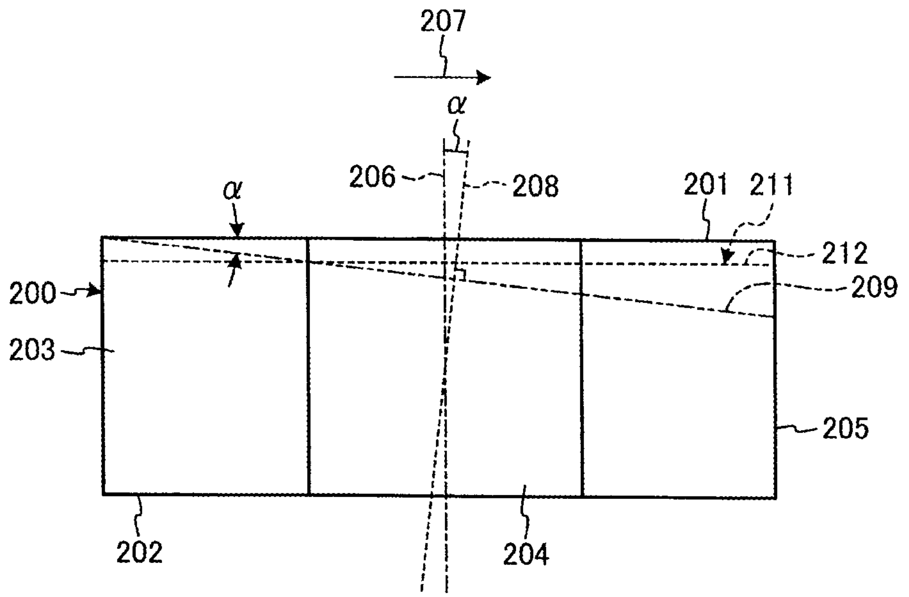
FIG. 3 is a side view of the ingot depicted in FIG. 2.
Figure 4:
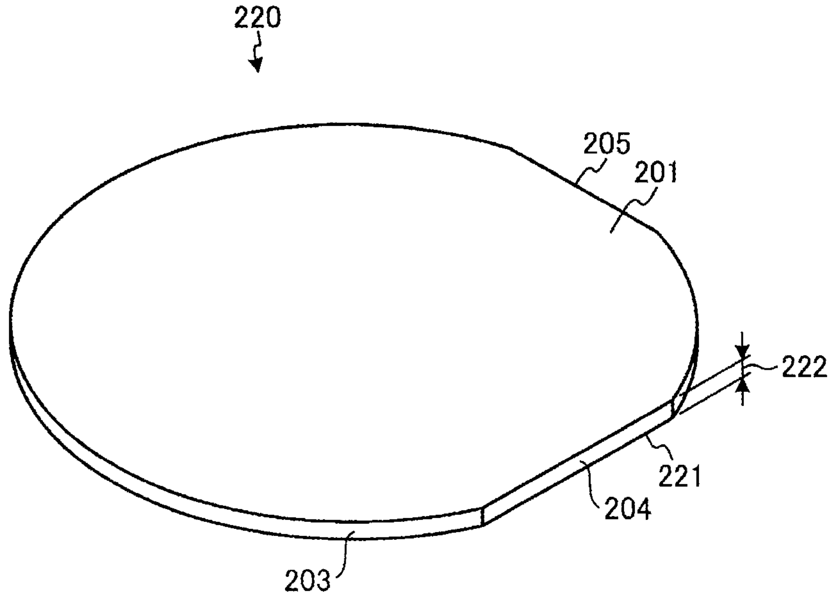
FIG. 4 is a perspective view of a wafer produced by separating a portion of the ingot depicted in FIG. 2.
Figure 5:
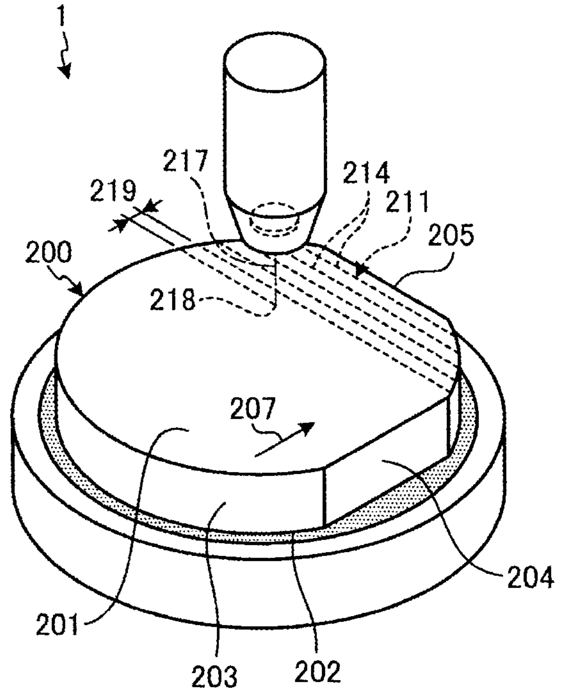
FIG. 5 is a perspective view depicting how to form separating layers in the ingot depicted in FIG. 2.
Figure 6:
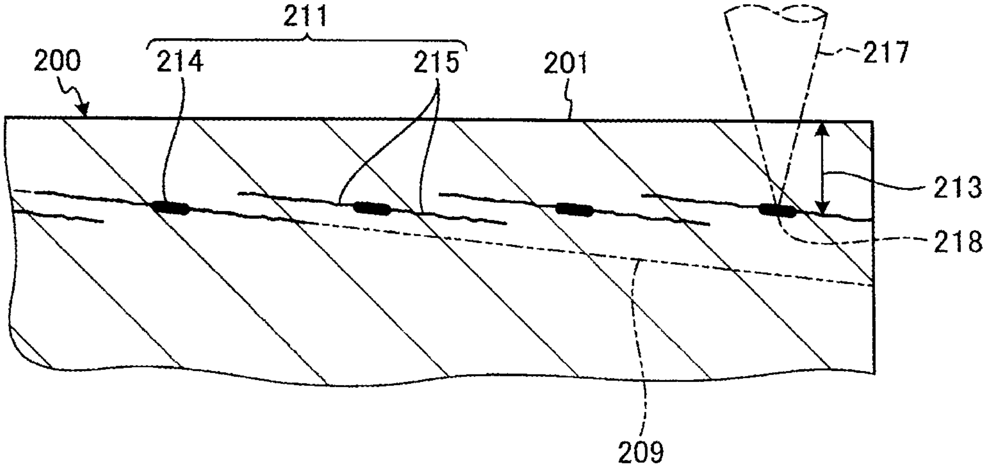
FIG. 6 is a fragmentary cross-sectional view taken along line VI-VI of FIG. 5 and depicting how to form the separating layers in the ingot depicted in FIG. 2.

A marking machine 1 according to the embodiment of the first aspect of the present invention will be described based on FIGS. 1 through 6. FIG. 1 is a perspective view depicting a configuration example of the marking machine 1 according to this embodiment. FIG. 2 is a perspective view of an ingot 200 to be marked by the marking machine 1 depicted in FIG. 1. FIG. 3 is a side view of the ingot 200 depicted in FIG. 2. FIG. 4 is a perspective view of a wafer 220 produced by separating a portion of the ingot 200 depicted in FIG. 2. FIG. 5 is a perspective view depicting how to form separating layers 211 in the ingot 200 depicted in FIG. 2. FIG. 6 is a fragmentary cross-sectional view taken along line VI-VI of FIG. 5 and depicting how to form the separating layers 211 in the ingot 200 depicted in FIG. 2.

(Ingot)

The marking machine 1 of this embodiment depicted in FIG. 1 applies markings to the ingot 200 depicted in FIG. 2. In this embodiment, the ingot 200, which is to be marked by the marking machine 1 according to this embodiment and is depicted in FIGS. 1 and 2, is made from silicon carbide (SiC), and is formed in a cylindrical shape as a whole. In this embodiment, the ingot 200 is a hexagonal single-crystal ingot.

As depicted in FIGS. 2 and 3, the ingot 200 has a first surface 201, a second surface 202, and a peripheral surface 203. The first surface 201 is formed in a circular shape and is an upper surface. The second surface 202 is located on a side opposite to the first surface 201, is formed in a circular shape, and is a lower surface. The peripheral surface 203 extends to an outer edge of the first surface 201 and an outer edge of the second surface 202. On the peripheral surface 203, the ingot 200 also has a first orientation flat 204 indicating a crystal orientation of the ingot 200, and a second orientation flat 205 that is orthogonal to the first orientation flat 204 and indicates the crystal orientation of the ingot 200. The orientation flats 204 and 205 are planar surfaces, and are in forms of straight lines as seen in a plan view of the ingot 200. The first orientation flat 204 has a length 204-1 longer than a length 205-1 of the second orientation flat 205.

The ingot 200 also has a c-axis 208, and a c-plane 209 that is orthogonal to the c-axis 208. The c-axis 208 is inclined, at an off-angle $\alpha$ relative to a normal 206 to the first surface 201, in an incline direction 207 toward the second orientation flat 205. The c-plane 209 is also inclined at the off-angle $\alpha$ relative to the first surface 201 of the ingot 200. The incline direction 207 of the c-axis 208 from the normal 206 is orthogonal to the direction of extension of the second orientation flat 205, and is parallel to the first orientation flat 204.

On a molecular level of the ingot 200, an innumerable number of c-planes 209 is set in the ingot 200. In this embodiment, the off-angle $\alpha$ is set at 1°, 4°, or 6°. In the present invention, however, the ingot 200 can be produced by setting the off-angle $\alpha$ as desired, for example, in a range of 1° to 6°.

After the first surface 201 has been subjected to grinding processing by a grinding machine, the ingot 200 is then subjected to polishing processing by a polishing machine, whereby the first surface 201 is formed into a mirror surface. The ingot 200 is separated at a portion thereof on a side of the first surface 201, and the separated portion is then produced into the wafer 220 depicted in FIG. 4. It is to be noted that plural kinds of ingots 200 of different diameters 210 exist.

The wafer 220 depicted in FIG. 4 is produced by separating the portion of the ingot 200, the portion including the first surface 201, as the ingot 200 and then applying grinding processing, polishing processing and the like to a separated surface 221 separated from the ingot 200. After separated from the ingot 200 and subjected to the grinding processing, polishing processing and the like, devices are formed on a surface of the wafer 220. In this embodiment, the devices are metal-oxide-semiconductor field-effect transistors (MOSFETs), micro electro mechanical systems (MEMS), or Schottky barrier diodes (SBDs), although the devices are not limited to MOSFETs, MEMS, or SBDs in the present invention. It is to be noted that, in the wafer 220, the same parts as those of the ingot 200 are identified by the same reference numerals, and their description is omitted.

After the formation of the separating layers 211 depicted in FIG. 3, the portion of the ingot 200 depicted in FIGS. 2 and 3, specifically the wafer 220 to be produced is separated using the separating layers 211 as separation starting interfaces. Each separating layer 211 is formed by irradiating a pulsed laser beam 217 (see FIGS. 5 and 6) of a wavelength, which has transmissivity for the ingot 200, to the ingot 200 with a focal point 218 of the pulsed laser beam 217 being positioned at a depth 213 (see FIG. 6) corresponding to a thickness 222 (see FIG. 4) of the to-be-produced wafer 220 from the first surface 201 of the ingot 200 while moving the ingot 200 relative to the laser beam 217 along the second orientation flat 205.

As depicted in FIGS. 5 and 6, when the laser beam 217 is irradiated, SiC dissociates into silicon (Si) and carbon (C), the pulsed laser beam 217 irradiated next is absorbed in the C formed previously, and SiC dissociates into Si and C in a chain manner. As a consequence, modified portions 214 are formed along the second orientation flat 205 inside the ingot 200, and at the same time, cracks 215 are formed extending from the modified portions 214 along the c-plane 209. The separating layer 211, which includes the modified portions 214 and the cracks 215 formed from the modified portions 214 along the c-plane 209, is therefore formed inside the ingot 200 when the pulsed laser beam 217 of the wavelength having transmissivity for the ingot 200 is irradiated.

After the separating layer 211 has been formed over the entire length of the second orientation flat 205, the ingot 200 is moved (hereinafter referred to as "is subjected to index feeding") relative to the laser beam 217 over a predetermined move distance 219 along the first orientation flat 204, and then while the ingot 200 is moved relative to the laser beam 217 along the second orientation flat 205 with the focal point 218 of the laser beam 217 positioned at the above-mentioned depth 213, the laser beam 217 is irradiated to the ingot 200, so that the next separating layer 211 is formed. The irradiation of the laser beam 217 while moving the ingot 200 relative to the laser beam 217 along the second orientation flat 205 and the index feeding of the ingot 200 are alternately repeated until the separating layers 211 are formed over the entire area below the first surface 201, whereby the separating layers 211 are formed over the entire area below the first surface 201.

After the portion of the ingot 200, namely the wafer 220 has been separated using the separating layers 211 as separation starting interfaces, a new surface 212 of the ingot 200, the new surface 212 having been created as a result of the separation of the wafer 220, is formed into a mirror surface by grinding processing and polishing processing, so that the new surface 212 is formed into a first surface 201. Separating layers 211 are again formed to separate another wafer 220. As understood from the foregoing, the ingot 200 progressively becomes thinner as wafers 220 are separated one after another. Until the ingot 200 is thinned to a predetermined thickness, the separating layers 211 are repeatedly formed to separate the wafers 220 one after another.

As depicted in FIG. 2, the ingot 200 also includes ingot information 216 formed on the second surface 202. The ingot information 216 indicates information on the ingot 200, and in this embodiment, is configured in the form of identification (ID) information including a name and code of the ingot 200 and distinguishing it from other ingots 200.

Described specifically, the ingot information 216 is a two-dimensional code in this embodiment, although it may be a one-dimensional code. Further, the ingot information 216 may be indicated on the second surface 202 by printing it there or adhering a printed seal or the like there. The ingot information 216 is formed at a center of the second surface 202 in this embodiment, but the position where the ingot information 216 is formed is not limited to the center of the second surface 202 in the present invention.

In the present invention, the ingot 200 may also have an off-angle α of zero degrees and may also be an ingot formed from a material other than SiC, such as gallium nitride (GaN).

(Marking Machine)

The marking machine 1 according to this embodiment will be described. The marking machine 1 applies markings to the ingot 200 having the separating layers 211 formed at the depth corresponding to the thickness 222 of the wafer 220 to be produced. The marking machine 1 includes a machine main body 2, an ingot loading stage 3 disposed on the machine main body 2, a reading unit 4, a holding table 10, a moving unit 20, a marking unit 30, an imaging unit 40, and a control unit 90.

On the ingot loading stage 3, the ingot 200 is loaded. In this embodiment, the ingot loading stage 3 is arranged adjacent the holding table 10 of the machine main body 2. In this embodiment, the second surface 202 of the ingot 200 is loaded directly on the ingot loading stage 3.

The reading unit 4 reads the ingot information 216 formed on the second surface 202 of the ingot 200 loaded on the ingot loading stage 3. In this embodiment, the reading unit 4 is disposed below the ingot loading stage 3 and is arranged at a position vertically facing the ingot information 216 of the ingot 200 loaded directly on the ingot loading stage 3. In this embodiment, the reading unit 4 includes a plurality of imaging devices to image the ingot information 216 of the ingot 200 loaded directly on the ingot loading stage 3. The imaging devices are, for example, charge-coupled imaging devices (CCDs), or complementary MOS (CMOS) imaging devices.

The reading unit 4 images the ingot information 216 of the ingot 200 loaded directly on the ingot loading stage 3 to acquire an image of the ingot information 216, and outputs the acquired image to the control unit 90. The reading unit 4 reads the ingot information 216 by imaging the ingot 200 from a side of the second surface 202 of the ingot 200 to capture an image of the ingot information 216, and outputting the thus-acquired image of the ingot information 216 to the control unit 90.

It is to be noted that, in the present invention, the reading unit 4 may be configured of a known barcode reader, and markings may be applied to the to-be-produced wafer 220 by loading the ingot 200 on the ingot loading stage 3 with the ingot information 216 directed upward, reading the ingot information 216 from above by the reading unit 4, reversing the ingot 200 upside down, and then transferring the ingot 200 to the holding table 10.

The holding table 10 holds the ingot 200 on a holding surface 11 that is parallel to a horizontal direction. In the holding table 10, the holding surface 11 is made from a porous material such as porous ceramics and is connected to a suction source such as an ejector. When the second surface 202 of the ingot 200 is placed on the holding surface 11 and the holding surface 11 is then suctioned by the suction source, the holding table 10 holds the ingot 200 under suction on the holding surface 11.

The marking unit 30 applies markings to the to-be-produced wafer 220 of the ingot 200 held on the holding table 10. In this embodiment, the marking unit 30 irradiates a pulsed laser beam of a wavelength, which has absorptivity for the ingot 200 held on the holding table 10, to the ingot 200 with a focal point of the laser beam set at the first surface 201 of the ingot 200, whereby the markings are applied to the first surface 201 of the ingot 200, that is, the first surface 201 of the wafer 220 to be produced. In the present invention, the marking unit 30 may alternatively apply markings to an inside of the to-be-produced wafer 220 by irradiating a pulsed laser beam of a wavelength, which has transmissivity for the ingot 200 held on the holding table 10, to the ingot 200 with a focal point of the laser beam set inside the ingot 200.

In this embodiment, the marking unit 30 is supported on a gantry frame 5 disposed upright from the machine main body 2 as depicted in FIG. 1. The marking unit 30 includes an oscillator that emits the pulsed laser beam 217 for applying markings to the ingot 200, a condenser that condenses the laser beam 217 emitted from the oscillator toward the first surface 201 of the ingot 200 held on the holding surface 11 of the holding table 10, and a focal point moving unit that moves the condenser in a vertical direction to change the position of the focal point in the vertical direction.

The moving unit 20 moves the marking unit 30 and the imaging unit 40 relative to the holding table 10 in an X-axis direction and Y-axis direction parallel to the holding surface 11, and also rotates the holding table 10 about an axis of rotation parallel to a Z-axis direction that is parallel to the vertical direction. In this embodiment, the moving unit 20 includes a table moving unit 21 that moves the holding table 10 along the X-axis direction, a marking moving unit 22 that moves the marking unit 30 and the imaging unit 40 in the Y-axis direction orthogonal to the X-axis direction, and a table rotation unit 23 that rotates the holding table 10 about the axis of rotation. The table moving unit 21 supports the table rotation unit 23 thereon and moves the holding table 10 together with the table rotation unit 23 in the X-axis direction.

The imaging unit 40 includes a plurality of imaging devices to image the ingot 200 held on the holding table 10. The imaging devices are, for example, CCDs, or CMOS imaging devices. The imaging unit 40 images the ingot 200 held on the holding surface 11 of the holding table 10 to capture an image for performing an alignment to ensure positional registration between the ingot 200 and the marking unit 30, and outputs the captured image to the control unit 90. In this embodiment, the imaging unit 40 is supported on the frame 5.

The control unit 90 controls the above-mentioned elements of the marking machine 1 individually or in combination, thereby making the marking machine 1 perform marking operation on the ingot 200. The control unit 90 is a computer, which includes an arithmetic processing unit having a microprocessor such as a central processing unit (CPU), a storage device having a memory such as a read only memory (ROM) or a random access memory (RAM), and an input/output interface device. The arithmetic processing unit of the control unit 90 performs arithmetic processing according to a computer program stored in the storage device, and outputs control signals to the above-mentioned elements of the marking machine 1 via the input/output interface device to control the marking machine 1.

The control unit 90 is connected to a display unit (not depicted) and an input unit (not depicted). The display unit is configured by a liquid crystal display device or the like, which displays statuses, images and/or the like of processing operation. The input unit is used when an operator registers information about processing details and the like. The input unit is configured by at least one of a touch panel disposed in the display unit, and an external input device such as a keyboard.

The control unit 90 also includes a reading section 91, an information generating section 92, and a storage section 93. The reading section 91 generates identification (ID) information, which the ingot information 216 indicates, from the image of the ingot information 216 as imaged and acquired by the reading unit 4. The information generating section 92 generates markings (equivalent to information), which include the ID information indicated by the ingot information 216 and are to be formed on the ingot 200. The storage section 93 stores the ID information indicated by the ingot information 216 and read by the reading unit 4. In this embodiment, the storage section 93 stores the ID information generated by the reading section 91.

The functions of the reading section 91 and the information generating section 92 are realized through performance of arithmetic processing by the arithmetic processing unit according to the computer program stored in the storage section. The function of the storage section 93 is realized by the storage device.

A description will be made of operation of marking, that is, marking operation on the ingot 200 by the marking machine 1 of the above-mentioned configuration. In the marking machine 1, processing conditions are registered by the operator in the control unit 90, and the second surface 202 of the ingot 200 is loaded on the ingot loading stage 3. Upon receipt of a start instruction for the marking operation from the operator, the control unit 90 of the marking machine 1 starts the marking operation.

In the marking operation, the control unit 90 of the marking machine 1 makes the reading unit 4 image the ingot information 216 of the ingot 200, makes the reading section 91 generate the ID information, which the ingot information 216 indicates, from the image of the ingot information 216 as acquired by the imaging, and then makes the storage section 93 store the generated ID information.

In the marking operation, the ingot 200 is transferred from the ingot loading stage 3 onto the holding surface 11 of the holding table 10, and the control unit 90 operates the suction source to hold the second surface 202 of the ingot 200 under suction on the holding surface 11 of the holding table 10. In the marking operation, the control unit 90 of the marking machine 1 controls the moving unit 20 to move the holding table 10 to below the imaging unit 40, and then controls the imaging unit 40 to image the ingot 200.

Based on the image of the ingot 200 as imaged and acquired by the imaging unit 40, the control unit 90 of the marking machine 1 brings the marking unit 30 to vertically face an outer edge portion, where no devices will be formed, of the wafer 220 to be produced from the ingot 200. In the marking operation, the control unit 90 of the marking machine 1 controls the information generating section 92 to generate markings including the ID information.

In the marking operation, the control unit 90 of the marking machine 1 then controls the marking unit 30 to irradiates the laser beam to the ingot 200, which is held on the holding surface 11 of the holding table 10, with the focal point set at the first surface 201 of the ingot 200 while relatively moving the focal point and the ingot 200, whereby the markings with the ID information included therein are formed on the first surface 201 of the ingot 200. Based on the ID information indicated by the ingot information 216 and stored in the storage section 93, the marking unit 30, as described above, applies the markings, which include the ID information indicated by the ingot information 216, to the wafer 220 to be separated and produced from the ingot 200.

In the marking operation, the control unit 90 of the marking machine 1, after the formation of the markings including the ID information on the first surface 201 of the ingot 200 held on the holding table 10, controls the moving unit 20 to move the holding table 10 to adjacent the ingot loading stage 3, and then stops the suction holding of the ingot 200 on the holding table 10. In the marking operation, the control unit 90 of the marking machine 1 ends the marking operation when the ingot 200 is transferred from the holding table 10 to the ingot loading stage 3.

As described above, the marking machine 1 according to this embodiment reads the ingot information 216, which is formed on the second surface 202 of the ingot 200, by the reading unit 4, and based on the ingot information 216 so read, forms the markings, which include the ID information indicated by the ingot information 216, on the wafer 220 to be separated from the ingot 200. The marking machine 1 can therefore form the above-mentioned markings on the wafer 220, which is to be separated from the ingot 200, without the operator's operation.

Since the above-mentioned markings are formed on the wafer 220, which is to be separated from the ingot 200, without the operator's operation as described above, the marking machine 1 according to this embodiment exhibits advantageous effects to enable a contribution to a decrease of human errors, to enable formation of the above-mentioned markings on the wafer 220 while suppressing an increase in the man-hour of the operator, and also to enable trace back of the history of the wafer 220.

Embodiment of Second Aspect

Figure 7:
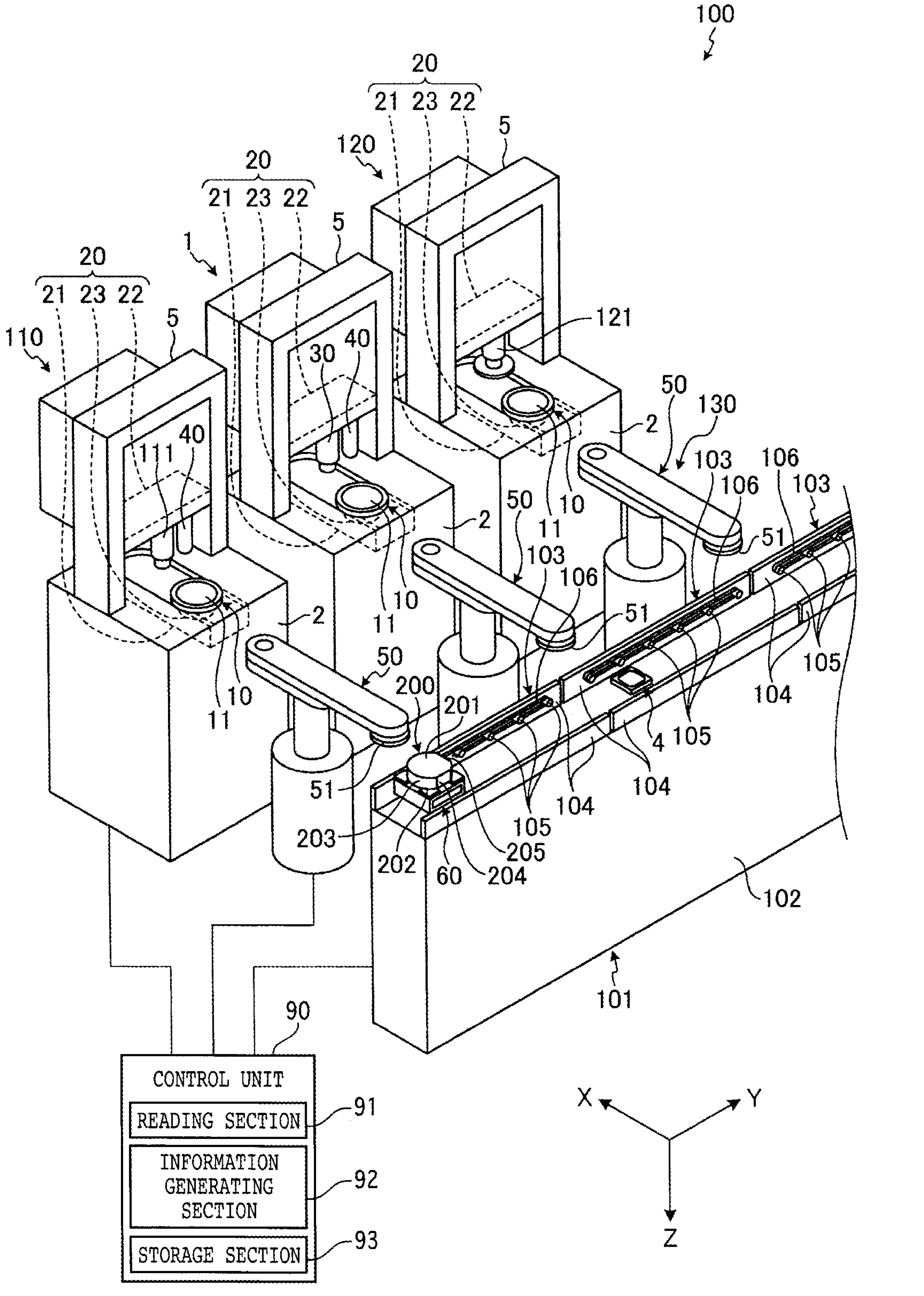
FIG. 7 is a perspective view depicting a configuration example of a wafer production system according to an embodiment of a second aspect of the present invention.
Figure 8:
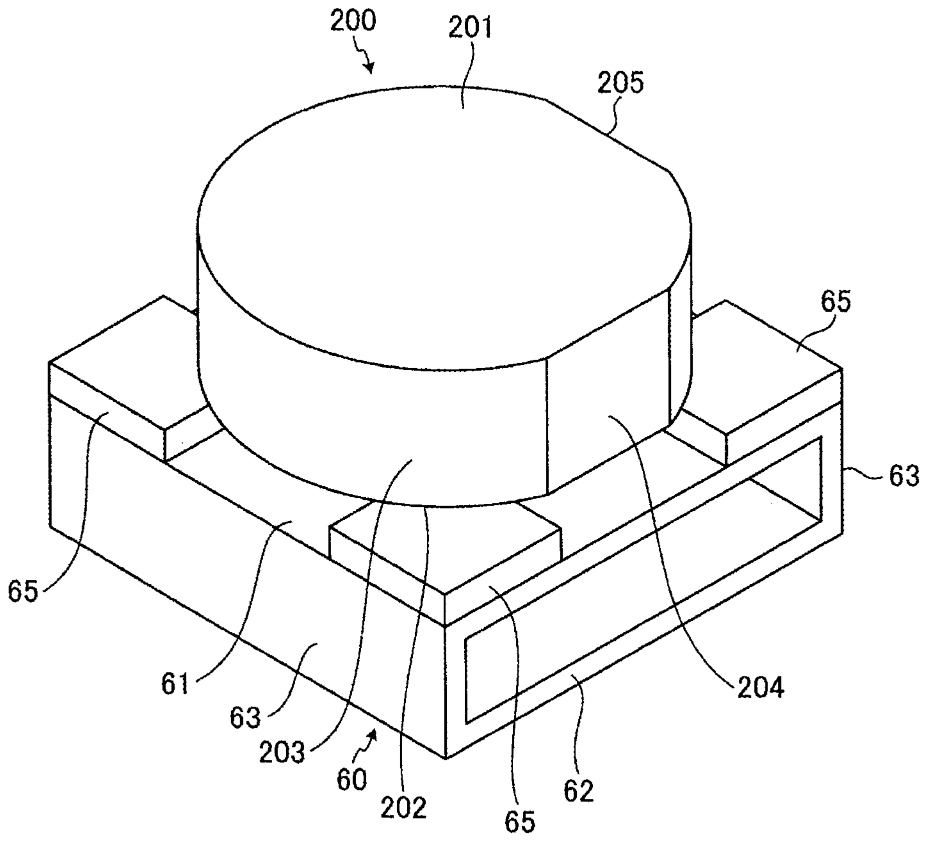
FIG. 8 is a perspective view depicting a tray which supports an ingot to be transferred by an ingot transfer unit of the wafer production system depicted in FIG. 7.
Figure 9:
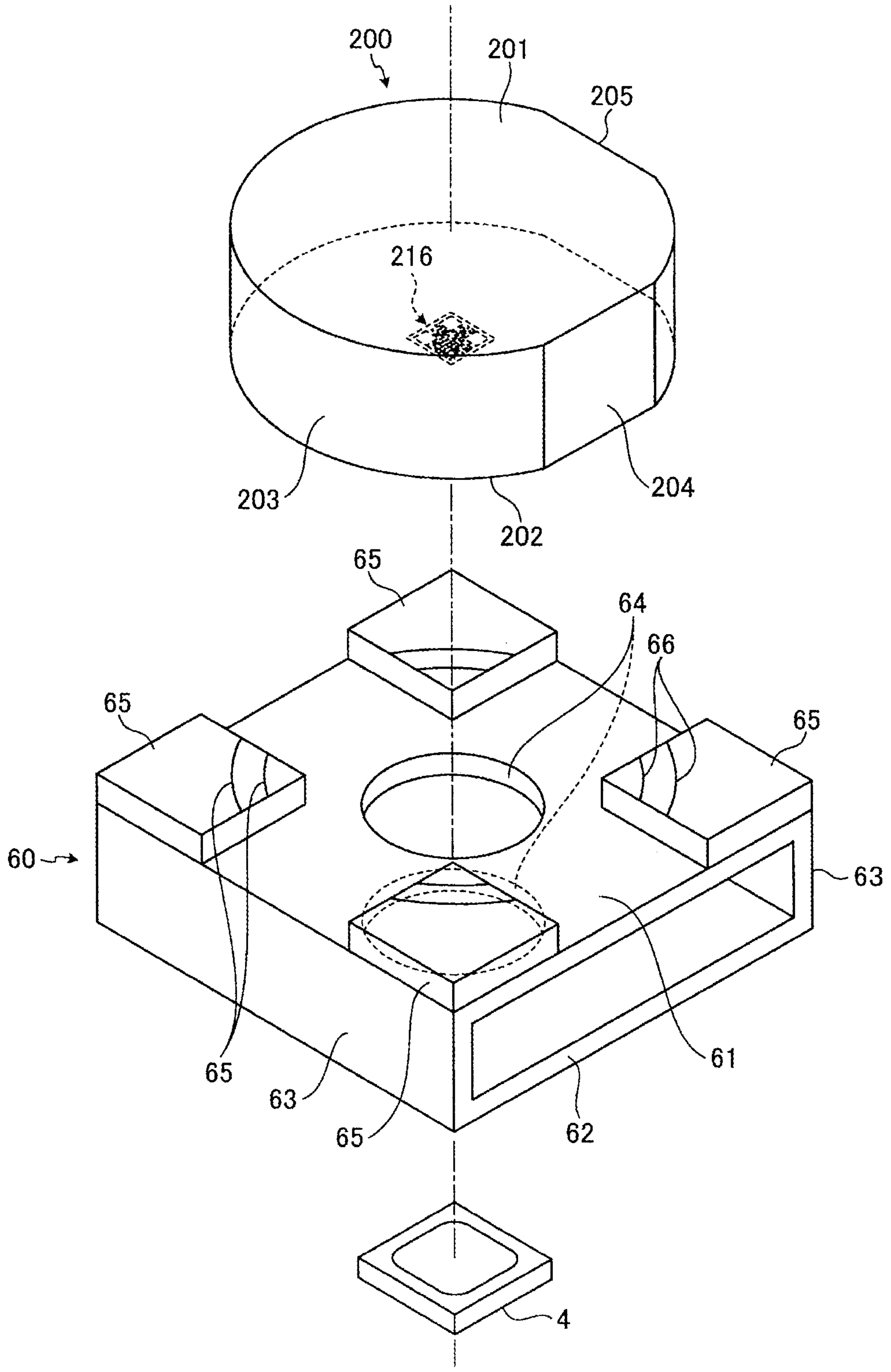
FIG. 9 is a perspective view depicting the tray and a reading unit of the wafer production system, and the ingot, all of which are depicted in FIG. 7.

A wafer production system 100 according to the embodiment of the second aspect of the present invention will be described based on FIGS. 7 through 9. FIG. 7 is a perspective view depicting a configuration example of the wafer production system 100 according to this embodiment. FIG. 8 is a perspective view depicting a tray 60 with an ingot 200, which is supported thereon and is to be transferred by an ingot transfer unit 101 of the wafer production system 100 depicted in FIG. 7. FIG. 9 is a perspective view depicting the tray 60 and a reading unit 4 of the wafer production system 100, and the ingot 200, all of which are depicted in FIG. 7. It is to be noted that in FIGS. 7 to 9, the same parts as those of the embodiment of the first aspect are identified by the same reference numerals, and their description is omitted.

The wafer production system 100 according to this embodiment forms a wafer 220 from the ingot 200 by forming separating layers 211 in the ingot 200, forming the above-mentioned markings on a first surface 201 of the ingot 200, and separating the wafer 220 from the ingot 200 while using the separating layers 211 as separation starting interfaces. As depicted in FIG. 7, the wafer production system 100 includes the ingot transfer unit 101, a separating layer forming machine 110, the marking machine 1, a separating machine 120, a reloading unit 130, and a control unit 90.

The ingot transfer unit 101 transfers the ingot 200, which is supported on the tray 60, over the separating layer forming machine 110, the marking machine 1, and the separating machine 120. The ingot transfer unit 101 includes a unit main body 102, and belt conveyors 103 disposed on an upper surface of the unit main body 102 and transfers the tray 60 with the ingot 200 supported thereon.

As depicted in FIGS. 8 and 9, the tray 60 includes a square upper wall 61, a square lower wall 62 disposed below the upper wall 61, and a pair of rectangular side walls 63 connecting the upper wall 61 and the lower wall 62 together, and the upper wall 61 and the lower wall 62 are disposed parallel to each other with an interval left therebetween, and are both disposed parallel to a vertical direction. As depicted in FIG. 9, the upper wall 61 and the lower wall 62 centrally include imaging windows 64, respectively. In this embodiment, the imaging windows 64 are holes having a circular shape in plan and extending through the upper wall 61 and the lower wall 62, respectively.

The upper wall 61 includes a plurality of ingot support portions 65 disposed on an upper surface of the upper wall 61 and around the corresponding imaging window 64. The ingot support portions 65 have upper surfaces formed parallel to a horizontal direction, and support a second surface 202 of the ingot 200 on the upper surfaces. On the upper surfaces of the ingot support portions 65, steps 66 are formed along a peripheral surface 203 of the ingot 200 having a diameter 210 (see FIG. 2), respectively. In this embodiment, one step 66 is formed on the upper surface of each ingot support portion 65. With the second surface 202 of the ingot 200 placed at predetermined positions where the outer edge of the peripheral surface 203 extends along the steps 66, the ingot support portions 65 position the ingot 200 at predetermined position.

When the second surface 202 of the ingot 200 is placed at the positions where the peripheral surface 203 extends along the steps 66 of the ingot support portions 65, the ingot information 216 is brought into a state in which it is positioned inside the imaging windows 64 as depicted in FIG. 9. The lower wall 62 is used to support on an upper surface thereof the wafer 220 separated from the ingot 200.

The belt conveyors 103 are arranged side by side in a Y-axis direction on the upper surface of the unit main body 102. In this embodiment, three belt conveyors 103 are arranged in a one-to-one correspondence with the separating layer forming machine 110, the marking machine 1, and the separating machine 120, respectively. Each belt conveyor 103 is arranged with an interval from the corresponding separating layer forming machine 110, marking machine 1, or separating machine 120, in an X-axis direction.

Each belt conveyor 103 includes a pair of support walls 104 disposed with an interval therebetween in the X-axis direction and each extending in the Y-axis direction, a plurality of rollers 105 rotatably attached to inner surfaces of the respective support walls 104 with an interval in the Y-axis direction, an endless belt 106 wrapped around the rollers 105, and a motor (now depicted) that rotates the rollers 105. The endless belt 106 circulates and runs over outer peripheries of the rollers 105, and transfers the tray 60 in the Y-axis direction. In this embodiment, the ingot transfer unit 101 transfers the single tray 60 by the endless belts 106 of the three belt conveyors 103. The ingot transfer unit 101 also includes tray stoppers (not depicted), each of which enables switching between a state, in which the transfer of the tray 60 on the endless belt 106 of the corresponding belt conveyor 103 is stopped, and another state, in which the transfer of the tray 60 on the endless belt 106 of the corresponding belt conveyor 103 is allowed. The tray stoppers enable a movement of the tray 60 between desired adjacent two of the endless belts 106 of the belt conveyors 103 by allowing the transfer of the tray 60 by the endless belts 106 of the desired adjacent two belt conveyors 103.

In each belt conveyor 103, the endless belt 106 moves the tray 60 in the Y-axis direction by rotating the rollers 105 with the motor and causing circulation and running of the endless belt 106 over the outer peripheries of the rollers 105. The ingot transfer unit 101 sequentially transfers the ingot 200, which is supported on the tray 60, to the separating layer forming machine 110, the marking machine 1, and the separating machine 120 by moving the tray 60 in the Y-axis direction.

The separating layer forming machine 110, the marking machine 1, and the separating machine 120 are arranged side by side in this order in the Y-axis direction. The separating layer forming machine 110 forms the separating layers 211 in the ingot 200. It is to be noted that, in the separating layer forming machine 110, the same elements as those in the marking machine 1 are identified by the same numerals, and their description is omitted. Further, for those which are not depicted in FIGS. 7 to 9 among the reference numerals in the following description, reference should be had to FIGS. 1 to 6.

The separating layer forming machine 110 includes the holding table 10 that holds the ingot 200, the laser beam irradiation unit 111 that forms the separating layers 211 by irradiating the below-described laser beam 217 to the ingot 200 held on the holding table 10, the imaging unit 40 that images the ingot 200 held on the holding table 10, and the moving unit 20 that moves the laser beam irradiation unit 111 and the imaging unit 40 relative to the holding table 10.

The laser beam irradiation unit 111 is supported on the frame 5, and irradiates a pulsed laser beam 217 of a wavelength, which has transmissivity for the ingot 200 held on the holding table 10, to the ingot 200 with a focal point 218 of the pulsed laser beam 217 being positioned at a depth 213 corresponding to a thickness 222 of the to-be-produced wafer 220 from the first surface 201 of the ingot 200, whereby the separating layers 211 are formed inside the ingot 200. The imaging unit 40 images the ingot 200 held on the holding table 10 to capture an image for performing an alignment to ensure positional registration between the ingot

200 and the laser beam irradiation unit 111, and outputs the captured image to the control unit 90.

The separating machine 120 separates the wafer 220, on which markings have been formed by the marking unit 30 of the marking machine 1, from the ingot 200 while using, as separation starting interfaces, the separating layers 211 formed by the laser beam irradiation unit 111 of the separating layer forming machine 110. It is to be noted that, in the separating machine 120, the same elements as those of the marking machine 1 are identified by the same reference numerals, and their description is omitted.

The separating machine 120 includes a holding table 10 that holds the ingot 200, a separating unit 121 that applies ultrasonic vibrations to the ingot 200 held on the holding table 10 to cause rupture of the ingot 200 while using the separating layers 211 as separating starting interfaces, and a moving unit 20 that relatively moves the separating unit 121 and the holding table 10.

The separating unit 121 is supported on a frame 5, and while using as separating starting interfaces the separating layers 211 formed by the laser beam irradiation unit 111, applies ultrasonic vibrations to the ingot 200 held on the holding table 10 to cause rupture of the ingot 200, so that the wafer 220 is separated from the ingot 200.

The reloading unit 130 transfers the ingot 200 between the tray 60, which is to be transferred by the endless belt 106 of each belt conveyor 103 of the ingot transfer unit 101, and the holding table 10 of the corresponding one of the separating layer forming machine 110, the marking machine 1, and the separating machine 120. The reloading unit 130 includes a plurality of (three, in this embodiment) transfer units 50.

The transfer units 50 are arranged side by side in the Y-axis direction, and correspond to the separating layer forming machine 110, the marking machine 1, and the separating machine 120, respectively. Each transfer unit 50 transfers the ingot between the ingot transfer unit 101 and the corresponding one of the separating layer forming machine 110, the marking machine 1, and the separating machine 120. The transfer unit 50 which corresponds to the separating layer forming machine 110 transfers the ingot 200 between the ingot support portions 65 of the tray 60, which is to be transferred by the endless belt 106 of the belt conveyor 103 corresponding to the separating layer forming machine 110, and the holding table 10 of the separating layer forming machine 110, whereby the ingot 200 supported on the tray 60 is transferred.

The transfer unit 50 which corresponds to the marking machine 1 transfers the ingot 200 between the ingot support portions 65 of the tray 60, which is to be transferred by the endless belt 106 of the belt conveyor 103 corresponding to the marking machine 1, and the holding table 10 of the marking machine 1.

The transfer unit 50 which corresponds to the separating machine 120 transfers the ingot 200 from the ingot support portions 65 of the tray 60, which has been transferred by the endless belt 106 of the belt conveyor 103 corresponding to the separating machine 120, onto the holding table 10 of the separating machine 120. The transfer unit 50 which corresponds to the separating machine 120 transfers the wafer 220, which has been separated from the ingot 200 held on the holding table 10 of the separating machine 120 while using the separating layers 211 as separation starting interfaces, onto the upper surface of the lower wall 62 of the tray 60 to be transferred by the endless belt 106 of the belt conveyor 103 corresponding to the separating machine 120. The transfer unit 50 which corresponds to the separating machine 120 also transfers the ingot 200, from which the wafer 220 has been separated and which is still held on the holding table 10 of the separating machine 120, onto the ingot support portions 65 of the tray 60 to be transferred by the endless belt 106 of the belt conveyor 103 corresponding to the separating machine 120.

It is to be noted that each transfer unit 50 is, for example, a robot, pick-and-place device including a disc-shaped transfer pad 51, holds the ingot 200 under suction on the transfer pad 51, and transfers the ingot 200.

In the wafer production system 100 according to this embodiment, the reading unit 4 is disposed on the upper surface of the unit main body 102 of the ingot transfer unit 101 at a location below the tray 60 transferred by the endless belt 106 of the belt conveyor 103 corresponding to the marking machine 1. Therefore, the wafer production system 100 according to this embodiment includes the reading unit 4. As seen in a plan view, the reading unit 4 is positioned inside the imaging windows 64 of the tray 60 transferred by the endless belt 106 of the belt conveyor 103 corresponding to the marking machine 1. In a similar manner as in the embodiment of the first aspect, the reading unit 4 reads the ingot information 216 of the ingot 200 supported on the ingot support portions 65 of the tray 60 before the ingot 200 is transferred onto the holding table 10 of the marking machine 1 by the corresponding transfer unit 50 of the reloading unit 130.

The control unit 90 controls the above-mentioned elements of the wafer production system 100 individually or in combination, thereby making the wafer production system 100 perform production operation to produce the wafer 220 from the ingot 200. The control unit 90 is a computer, which includes an arithmetic processing unit having a microprocessor such as a CPU, a storage device having a memory such as a ROM or a RAM, and an input/output interface device. The arithmetic processing unit of the control unit 90 performs arithmetic processing according to a computer program stored in the storage device, and outputs control signals to the wafer production system 100 via the input/output interface device to control the wafer production system 100.

A description will next be made of the production operation to produce the wafer 220 from the ingot 200 by the wafer production system 100 of the above-mentioned configuration. In the wafer production system 100, processing conditions are registered by an operator in the control unit 90, and the second surface 202 of the ingot 200 is placed at the predetermined positions on the ingot support portions 65 of the tray 60 to be transferred by the endless belt 106 of the belt conveyor 103 corresponding to the separating layer forming machine 110. Upon receipt of a start instruction for production operation from the operator, the control unit 90 of the wafer production system 100 makes the wafer production system 100 start the production operation.

In the production operation, the control unit 90 of the wafer production system 100 makes the transfer unit 50, which corresponds to the separating layer forming machine 110, transfer the ingot 200 from the tray 60 onto the holding surface 11 of the holding table 10, and by a suction force of the suction source, the second surface 202 of the ingot 200 is held under suction on the holding surface 11 of the holding table 10. In the production operation, the control unit 90 of the wafer production system 100 controls the moving unit 20 to move the holding table 10 to below the imaging unit 40, and makes the imaging unit 40 image the ingot 200 to perform an alignment to ensure positional registration between the laser beam irradiation unit 111 and the ingot 200 held on the holding table 10 of the laser beam irradiation unit 111.

In the production operation, the control unit 90 of the wafer production system 100, after the formation of the separating layers 211 in the ingot 200 by the separating layer forming machine 110, stops the suction holding of the ingot 200 on the holding table 10, and controls the transfer unit 50, the belt conveyor 103 and the like to transfer the ingot 200, in which the separating layers 211 have been formed, onto the ingot support portions 65 of the tray 60 to be transferred by the endless belt 106 of the belt conveyor 103 corresponding to the marking machine 1.

In the production operation, the control unit 90 of the wafer production system 100 makes the reading unit 4 image the ingot information 216 of the ingot 200, makes the reading section 91 generate ID information, which the ingot information 216 indicates, from the image of the ingot information 216 as acquired by the imaging, and then makes the storage section 93 store the generated ID information. In the production operation, the control unit 90 of the wafer production system 100 makes the transfer unit 50, which corresponds to the marking machine 1, transfer the ingot 200 from the tray 60 onto the holding surface 11 of the holding table 10 of the marking machine 1, and as in the embodiment of the first aspect, makes the marking machine 1 form the above-mentioned markings on the first surface 201 of the ingot 200, in other words, the wafer 220.

In the production operation, the control unit 90 of the wafer production system 100 controls the transfer unit 50, the belt conveyor 103, and the like, which correspond to the separating machine 120, to transfer the ingot 200, in and on which the separating layers 211 and the above-mentioned markings have been formed, onto the holding table 10 of the separating machine 120. In the production operation, the control unit 90 of the wafer production system 100 holds the second surface 202 of the ingot 200 under suction on the holding surface 11 of the holding table 10 of the separating machine 120, and makes the separating unit 121 apply ultrasonic vibrations to the ingot 200 to cause rupture of the ingot 200 while using the separating layers 211 as separation starting interfaces. In the production operation, the control unit 90 of the wafer production system 100 stops the application of ultrasonic vibrations and the suction holding of the ingot 200 on the holding table 10 after the ingot 200 has been caused to rupture while using the separating layers 211 as separating starting interfaces.

In the production operation, the control unit 90 of the wafer production system 100 makes the transfer unit 50, which corresponds to the separating machine 120, transfer the wafer 220, which has been separated from the ingot 200 on the holding table 10 of the separating machine 120, onto the upper surface of the lower wall 62 of the tray 60, and also transfer the remaining ingot 200 from the holding table 10 of the separating machine 120 onto the ingot support portions 65 of the tray 60. The wafer production system 100 repeatedly forms the separating layers 211 and markings to produce wafers 220 until the ingot 200 is thinned to a predetermined thickness.

The wafer production system 100 according to this embodiment reads the ingot information 216, which has been formed on the second surface 202 of the ingot 200, by the reading unit 4, and based on the ingot information 216 so read, forms the markings, which include the ingot information 216, on the wafer 220 to be separated from the ingot 200. Similar to the marking machine 1 of the embodiment of the first aspect, the wafer production system 100 can therefore form the above-mentioned markings on the wafer 220, which is to be separated from the ingot 200, without the operator's operation. Therefore, the wafer production system 100 according to the embodiment of the second aspect, similar to the marking machine 1 according to the embodiment of the first aspect, exhibits advantageous effects to enable the formation of the above-mentioned markings on the wafer 220 while suppressing an increase in the man-hour of the operator and also to enable trace back of the history of the wafer 220.

It is to be noted that the present invention should not be limited to the above-described embodiments. In other words, the present invention can be practiced with various modifications within the scope not departing from the spirit of the present invention. It is also to be noted that, in the present invention, the ingot information 216 is not limited to those containing ID information including a name and code of each ingot 200 and distinguishing the ingot 200 from other ingots 200.

In the present invention, the reading unit 4 may include not only one that reads the ingot information 216 before transferring the ingot 200 to the marking machine 1, but also one that reads the ingot information 216 before transferring the ingot 200 to the separating layer forming machine 110. In other words, the wafer production system 100 may include a plurality of reading units 4 in the present invention. In the present invention, the marking machine 1 and the wafer production system 100 may further include a reading unit for confirming markings after completion of formation of the markings.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A marking machine for applying markings to an ingot having separating layers formed at a depth corresponding to a thickness of a wafer to be produced, the marking machine comprising:

a reading unit configured to read an ingot identification information, which includes a name and a code of the ingot, formed on a surface of the ingot, such that the reading unit faces the surface of the ingot;

a control unit having a storage section configured to store the ingot identification information which has been read by the reading unit;

a marking unit with a laser beam irradiation unit which applies a marking that includes the ingot identification information to the wafer to be produced, based on the ingot identification information formed on the surface of the ingot, which was previously read by the reading unit and stored in the storage section; and a tray which includes a plurality of separated support portions upon which the ingot is placed, an upper surface of each of the plurality of separated support portions including at least one step which is formed to correspond with an outer peripheral surface of the ingot.

2. A wafer production system for producing a wafer from an ingot, the wafer production system comprising:

a reading unit configured to read an ingot identification information, which includes a name and a code of the ingot, formed on a surface of the ingot, such that the reading unit faces the surface of the ingot;

a control unit having a storage section configured to store the ingot identification information which has been read by the reading unit;

a first laser beam irradiation unit configured to form separating layers in the ingot by irradiating a laser beam of a wavelength that has transmissivity for the ingot, to the ingot with a focal point thereof positioned at a depth corresponding to a thickness of the wafer to be produced, from an upper surface of the ingot;

a marking unit with a second laser beam which applies a marking that includes the ingot identification information to the wafer to be produced, based on the ingot identification information formed on the surface of the ingot, which was previously read by the reading unit and stored in the storage section;

a separating unit configured to separate the wafer from the ingot using, as separation starting interfaces, the separating layers formed by the first laser beam irradiation unit; and a tray which includes an upper wall, a lower wall and a pair of side walls, and the upper wall and the lower wall centrally include imaging windows, respectively, wherein the tray includes a plurality of separated support portions disposed on an upper surface of the upper wall and around the corresponding imaging window such that the ingot is placed upon the plurality of separated support portions, and wherein the reading unit is positioned inside the imaging windows of the tray when reading the ingot identification information and reads the ingot identification information in a state in which the ingot identification information is positioned inside the imaging windows.

3. The wafer production system according to claim 2, wherein:

the ingot identification information is formed on a lower surface of the ingot, and the reading unit reads the ingot identification information by imaging the ingot from a side of the lower surface of the ingot.

4. The wafer production system according to claim 2, further comprising:

a transfer unit configured to transfer the ingot supported on the tray, wherein the reading unit reads the ingot identification information formed on the ingot with the ingot supported on the tray.

5. The marking machine according to claim 1, wherein the ingot identification information is in the form of a two-dimensional code or a one-dimensional code.

6. The wafer production system according to claim 2, wherein the ingot identification information is in the form of a two-dimensional code or a one-dimensional code.

7. The marking machine according to claim 1, wherein the marking unit is configured to face a surface of the wafer to be produced.

8. The wafer production system according to claim 2, wherein the marking unit is configured to face a surface of the wafer to be produced.

9. A marking machine for applying markings to an ingot having separating layers formed at a depth corresponding to a thickness of a wafer to be produced, the marking machine comprising:

a reading unit configured to read an ingot identification information formed on a surface of the ingot, such that the reading unit faces the surface of the ingot;

a control unit having a storage section configured to store the ingot identification information which has been read by the reading unit; and a marking unit with a laser beam irradiation unit which applies a marking that includes the ingot identification information to the wafer to be produced, based on the ingot identification information formed on the surface of the ingot, which was previously read by the reading unit and stored in the storage section;

an imaging unit with a plurality of imaging devices which image the ingot to capture an image of the ingot for performing an alignment between the ingot and the marking unit, such that the captured image of the ingot is outputted to the control unit; and a marking moving unit that moves the marking unit and the imaging unit, wherein the control unit:

controls the marking moving unit to bring the marking unit to vertically face the wafer to be produced from the ingot based upon the captured image, generates the markings which include the ingot identification information to the wafer to be produced, and controls the marking unit to irradiate the laser beam to the ingot with the focal point set at a first surface of the ingot while relatively moving the focal point and the ingot, whereby the markings with the ID information included therein are formed on the first surface of the ingot.

10. The wafer production system according to claim 2, wherein each of the separated support portions includes at least one step which is formed to correspond with an outer peripheral surface of the ingot.

* * * * *